(12) United States Patent
Bennett et al.

(10) Patent No.: US 6,789,686 B2
(45) Date of Patent: Sep. 14, 2004

(54) RACK WITH DIVIDED BASE PLATE FOR STACKING FLAT ARTICLES

(75) Inventors: Jason Bennett, Hong Kong (CH); Qing Wang, Dong Guan (CH)

(73) Assignee: Sunhing Millennium Limited, Kowloon (HK)

( * ) Notice: Subject to any disclaimer, the term of this patent is extended or adjusted under 35 U.S.C. 154(b) by 0 days.

(21) Appl. No.: 10/141,181

(22) Filed: May 9, 2002

(65) Prior Publication Data

US 2002/0179550 A1 Dec. 5, 2002

(30) Foreign Application Priority Data

May 9, 2001 (DE) ..................................... 201 07 825 U

(51) Int. Cl.[7] .................................................. A47F 7/00
(52) U.S. Cl. ......................... 211/40; 211/189; D6/407
(58) Field of Search ............................... 211/40, 41.12, 211/189, 346.3; 248/346.3; D6/407

(56) References Cited

U.S. PATENT DOCUMENTS

| | | | | |
|---|---|---|---|---|
| 5,642,815 A | * | 7/1997 | Mundorf et al. ............... | 211/40 |
| 5,749,477 A | * | 5/1998 | Chang .......................... | 211/40 |
| 5,788,088 A | * | 8/1998 | Kao ............................. | 211/40 |
| 5,984,115 A | * | 11/1999 | Koestenblatt et al. ......... | 211/40 |
| 6,016,925 A | * | 1/2000 | Hwang ......................... | 211/40 |
| 6,126,020 A | * | 10/2000 | Mok ............................. | 211/40 |
| D436,490 S | * | 1/2001 | Kwok .......................... | D6/630 |
| D448,598 S | * | 10/2001 | Mok et al. .................... | D6/630 |
| D464,841 S | * | 10/2002 | Chow et al. .................. | D6/630 |

* cited by examiner

*Primary Examiner*—Robert W. Gibson, Jr.
(74) *Attorney, Agent, or Firm*—Burns, Doane, Swecker & Mathis, L.L.P.

(57) ABSTRACT

A rack for stacking flat articles, in particular cases for CDs and other disc-type information carriers, has a stand part and a base part. The stand part is provided with substantially horizontally aligned compartments for accommodating the flat articles. The base part is formed by a base plate which can be connected with the stand part and the base area of which is larger than the projection of the stand part on the base plate. The base plate can be removed for packing purposes, and is divided into base plate parts which are of such a size that at least in one transverse dimension they do not project over the width of the stand part. Accordingly, the cross-section of packaging for the entire rack does not exceed, or exceeds only to an insignificant extent, the cross-section of the stand part. With uniform length and uniform cross-sectional shape, the packaging can be stacked very satisfactorily and can thus be conveyed in large bundles, for example on pallets shrink-wrapped in film or in suitable pallet containers.

9 Claims, 6 Drawing Sheets

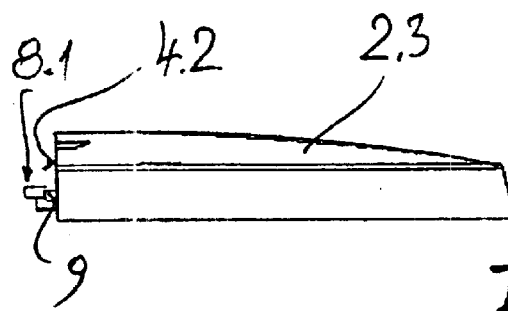
Fig. 5.1
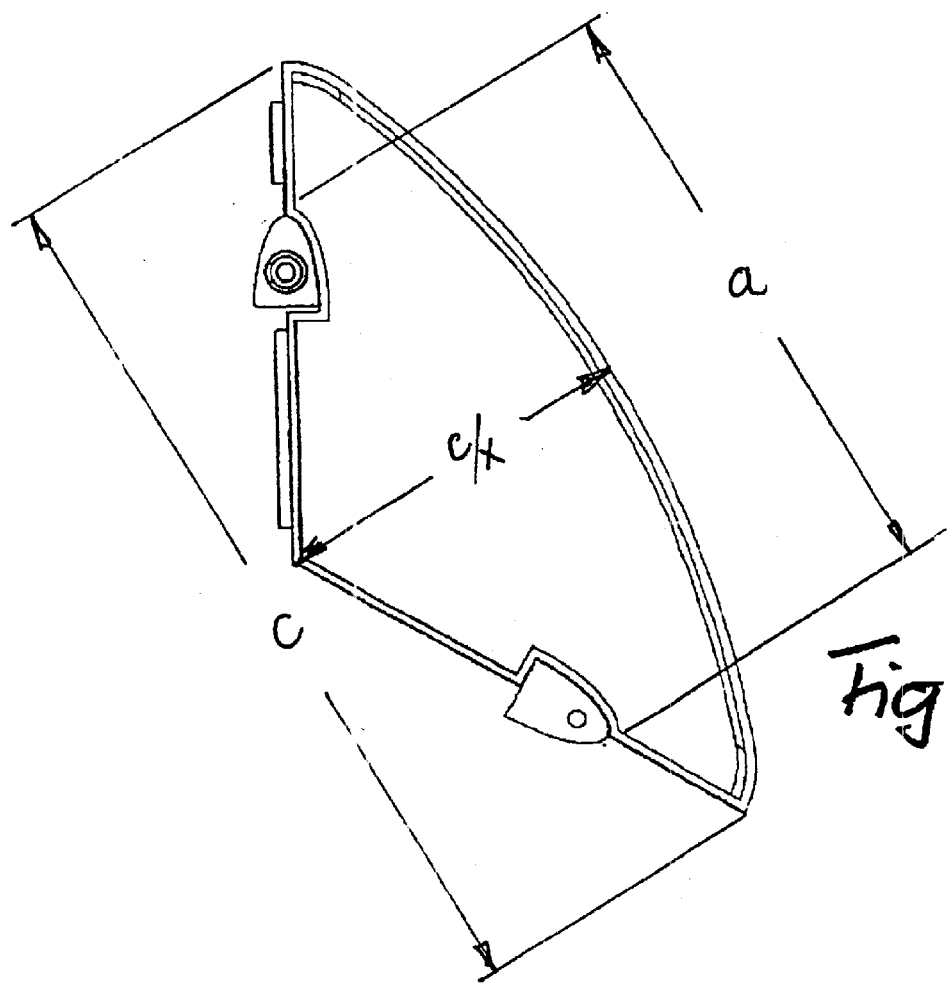
Fig. 5.2

RACK WITH DIVIDED BASE PLATE FOR STACKING FLAT ARTICLES

Racks for stacking flat articles, in particular CD cases or the like, have as a rule a tower-like stand part of up to one meter or more in height. However, the stand part is substantially only of a cross-section corresponding to the size of a CD case. In order to provide sufficient stability the stand part is provided with a base plate which has a considerably larger base area than the base area of the stand part. Since racks of this type are sold and supplied to the consumer packed in boxes, the necessarily large base plate poses a significant packaging problem.

The invention is based on the object of devising a rack of the above-mentioned type, which makes possible simple packing while retaining a large base area and thus good stability for a rack of this type.

This object is achieved according to the invention by a rack for stacking flat articles, in particular cases for disc-type information carriers, having a stand part and a base part, wherein the stand part is provided with substantially horizontally aligned compartments for accommodating the flat articles, wherein the base part is formed by a base plate which can be connected with the stand part and the base area of which is larger than the projection of the stand part on the base plate, which is assembled from at least two base plate parts. A rack designed in this way has the advantage that the base plate can be removed for packing purposes. The base plate is divided into base plate parts which are of such a size that at least in one transverse dimension they do not project over the width of the stand part. Accordingly, the possibility is offered of providing a packaging for the entire rack, the cross-section of which does not exceed or exceeds only to an insignificant extent the cross-section of the stand part. The packaging is then of a length which corresponds substantially to the height of the stand part and is of a cross-section which corresponds substantially to the cross-section of the stand part. The cross-sectional shape of the packaging may in this case be of square or slightly rectangular, circular or even triangular design, so that with uniform length and uniform cross-sectional shape the packagings can be stacked very satisfactorily and can thus be conveyed in large bundles, for example on pallets shrink-wrapped in film or in suitable pallet containers.

In an advantageous development of the invention it is provided for the base plate parts to have on their separating surfaces aligned perpendicularly to the plane of the plate projections and/or recesses associated with one another so that the base plate parts can be joined together in a plug-in form-locking manner.

In an advantageous further development of the invention it is provided for the base plate parts to have recesses in the connection zone with base supports of the stand part. In addition to a form-locking connection of the base plate parts with one another via the base supports fitted into the recesses, there is also a form-locking connection with the stand part, wherein by way of the different form-locking planes the form-locking connection between the base plate parts is fixed by the form-locking connection with the base supports of the stand part. This offers the advantage that in the vicinity of the form-locking connection with the base supports the individual base plates can be fixed directly to the base supports via a separable connection, for example by a screw connection or also by a snap-fit connection or the like.

Further developments of the invention will be evident from the following description of examples of embodiment and from the sub-claims.

The invention will be illustrated schematically in more detail below with reference to the drawings, wherein:

FIG. 5 shows a base plate part according to FIG. 4 in a side view (FIG. 5.1) and a view from below (FIG. 5.2);

Figure 1:
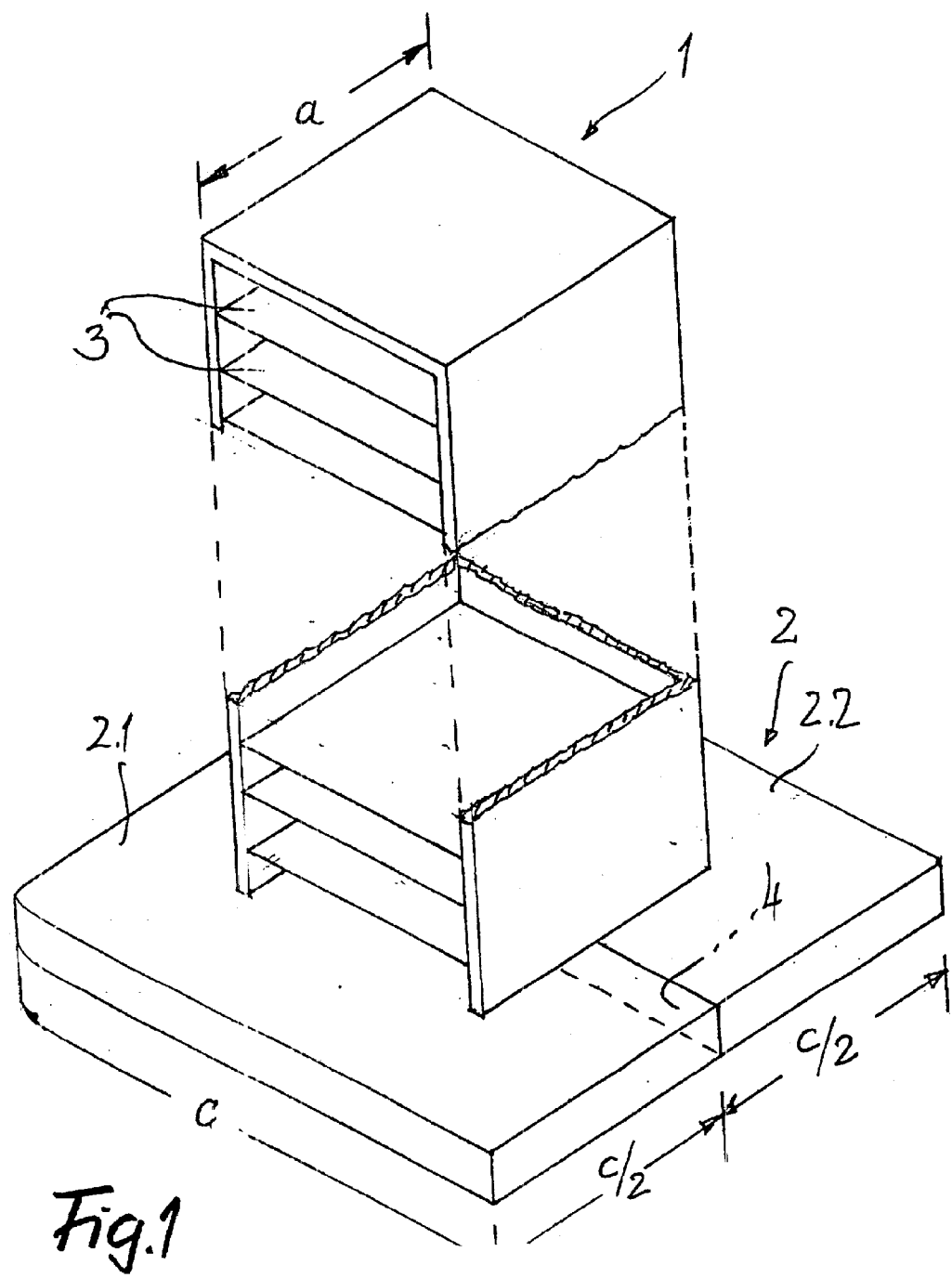
FIG. 1 shows a general view of a CD rack according to the invention.

The embodiment of a rack for stacking CD cases or DVD cases illustrated schematically in FIG. 1 substantially comprises a stand part 1 and a base part in the form of a base plate 2. The height of the stand part 1 may be 1 m or more so that the base plate 2 must be of a suitable size to ensure stability. The stand part 1 is provided with a corresponding number of substantially horizontally aligned compartments 3 for accommodating the flat articles, i.e. the cases.

In the present case the stand part 1 is square in plan view so that the cases inserted into the compartments 3 project from the opening surface to a small extent and thus enable them to be easily gripped for removal.

The side length of the stand part corresponds to the dimension $a$. The base plate 2, which is also of square shape in the illustrated example of embodiment, has a side length of the dimension $c$. In this case the base plate 2 is divided into two base plate parts 2.1 and 2.2 of equal size, which are of corresponding rectangular contour with a side dimension $c$ along the long side and with a dimension $c/2$ along the short side so that a square contour results in the assembled condition.

The two base plate parts 2.1 and 2.2 are securely joined together along a separating plane 4 and are each securely connected (not shown here) to the lower end of the stand part 1. The connection between the base plate 2 and the stand part 1, as well as the connection between the two base plate parts 2.1 and 2.2 is designed to be separable, for example by a screw connection; however, a snap-fit connection or the like is also possible. With respect to the separability, it merely sufficient for the parts to be able to be fitted into one another for assembly. Thereafter any separation is as a rule unnecessary.

If a side dimension of c2a is now chosen, this then results in base plate parts 2.1 and 2.2 with a side length of c/2=a. By adjusting the dimensions in this way it is possible to fit the stand part 1 into a narrow packaging box, into which the two base plate parts can then also be introduced adjacent one lateral surface of stand part. This results in a compact packaging which corresponds substantially to the size of the stand part 1, which can be stacked satisfactorily and which can also be packed in large bundles. On the other hand, the possibility also arises of providing large base plates for a rack of this type.

The rack can be produced in conventional manner from a wide variety of materials, optionally also manufactured from different materials. The rack can be produced entirely from plastics material, wood or even metal. It is also possible for a stand part to be made, for example, from plastics material or wood and, so as to increase stability, for a foot plate to be made of a heavier material, for example metal.

If a considerably larger base plate is to be constructed, the basic principle described with reference to FIG. 1 also offers the possibility of dividing the base plate 2 into three corresponding rectangular base plate parts, wherein the small side length of a base plate part again corresponds to the dimension $a$ so that the total side length $c$ of the base plate then corresponds to the dimension $3a$. Even with a base plate of such large dimensions it is possible, as described above, for the base plate parts to be inserted into the packaging with the stand part 1 on one lateral surface thereof, assuming that the total length of the stand part is greater than the dimension $3a$.

The embodiment according to FIG. 1 can also be designed with different plan views of the stand part 1 and the base plate 2. Accordingly, it is possible, for example, for a stand part 1 of circular, elliptical or even U-shaped cross-section to be mounted on a square, circular, oval or elliptical base plate. In practice no limits are placed on the freedom of design. Only when deciding on the dimensions of the base plate 2 is it necessary for the division to be effected so that its smallest lateral dimension corresponds to the largest lateral dimension of the stand part 1, as has been described and illustrated as a basic principle with reference to FIG.1.

Figure 2:
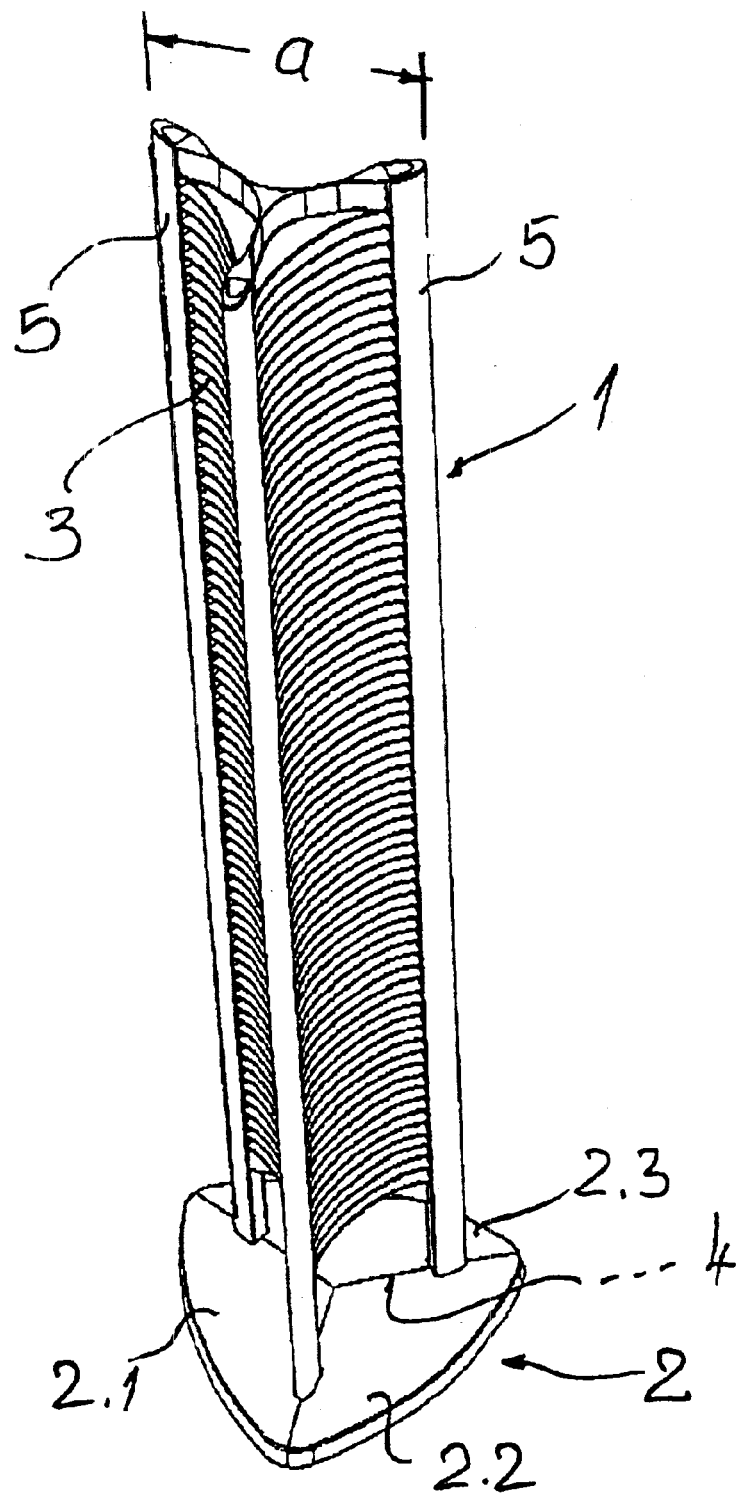
FIG. 2 shows a special embodiment of a CD rack.

FIG. 2 illustrates a special embodiment of a rack for accommodating CDs, which again is assembled from a stand part 1 and a base plate 2. The special feature of the embodiment according to FIG. 2 is that three base supports 5 are arranged at an equal distance apart so that from each side a CD can be inserted into one of the compartments 3 provided between the base supports.

In the case of the triangular plan contour defined by the arrangement of the base supports 5 a substantially triangularly shaped base plate 2 is provided which in the embodiment illustrated by way of example is divided into three base plate parts 2.1, 2.2 and 2.3. The separating planes 4 each extend in the vicinity of the lower ends of the base supports 5, as will be explained in more detail below.

Figure 3:
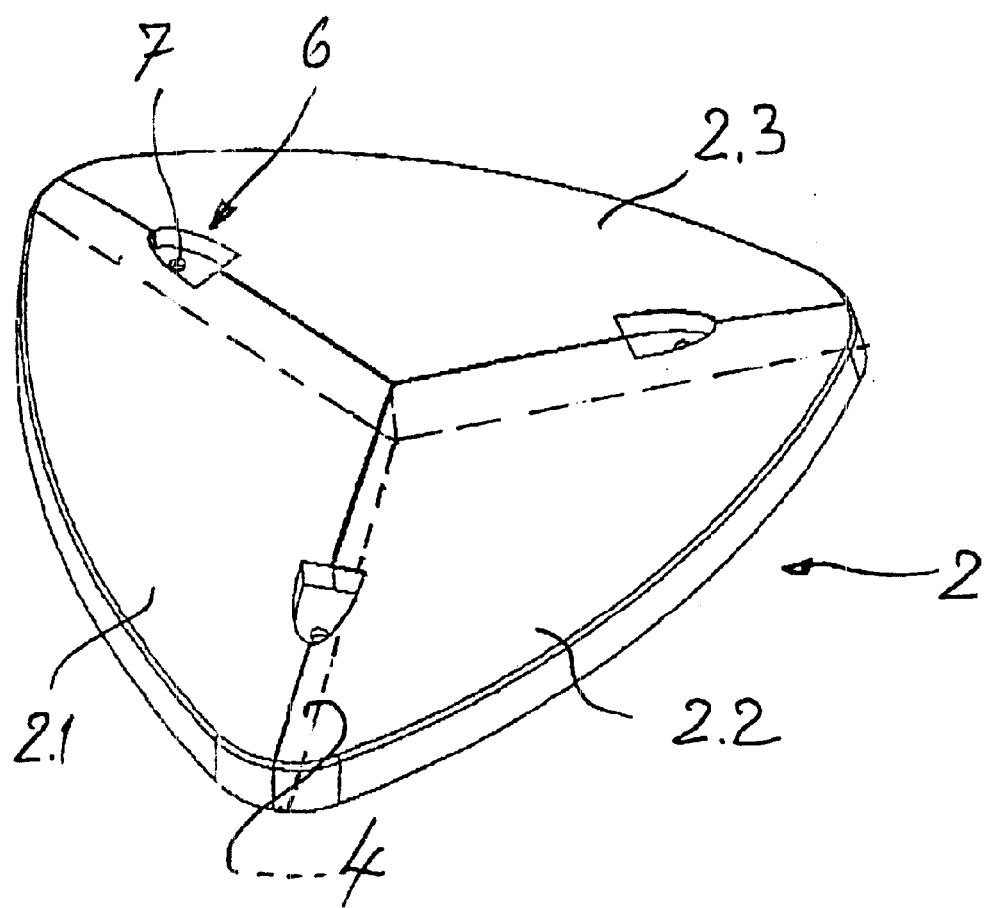
FIG. 3 shows a base plate for the embodiment according to FIG. 2 on an enlarged scale.

FIG. 3 illustrates the base plate 2 of the example of embodiment of FIG. 2 in perspective. As is evident from FIG. 3, respective recesses 6 are provided in the base plate 2, into which the free lower ends of the supports 5 are fitted. The recesses 6 are provided with through-holes 7, through which a connecting screw can be screwed to effect a secure connection between the base plate 2 and the base supports 5. The individual plates are of identical shape so that only one die or forming tool is required for manufacture.

Figure 4:
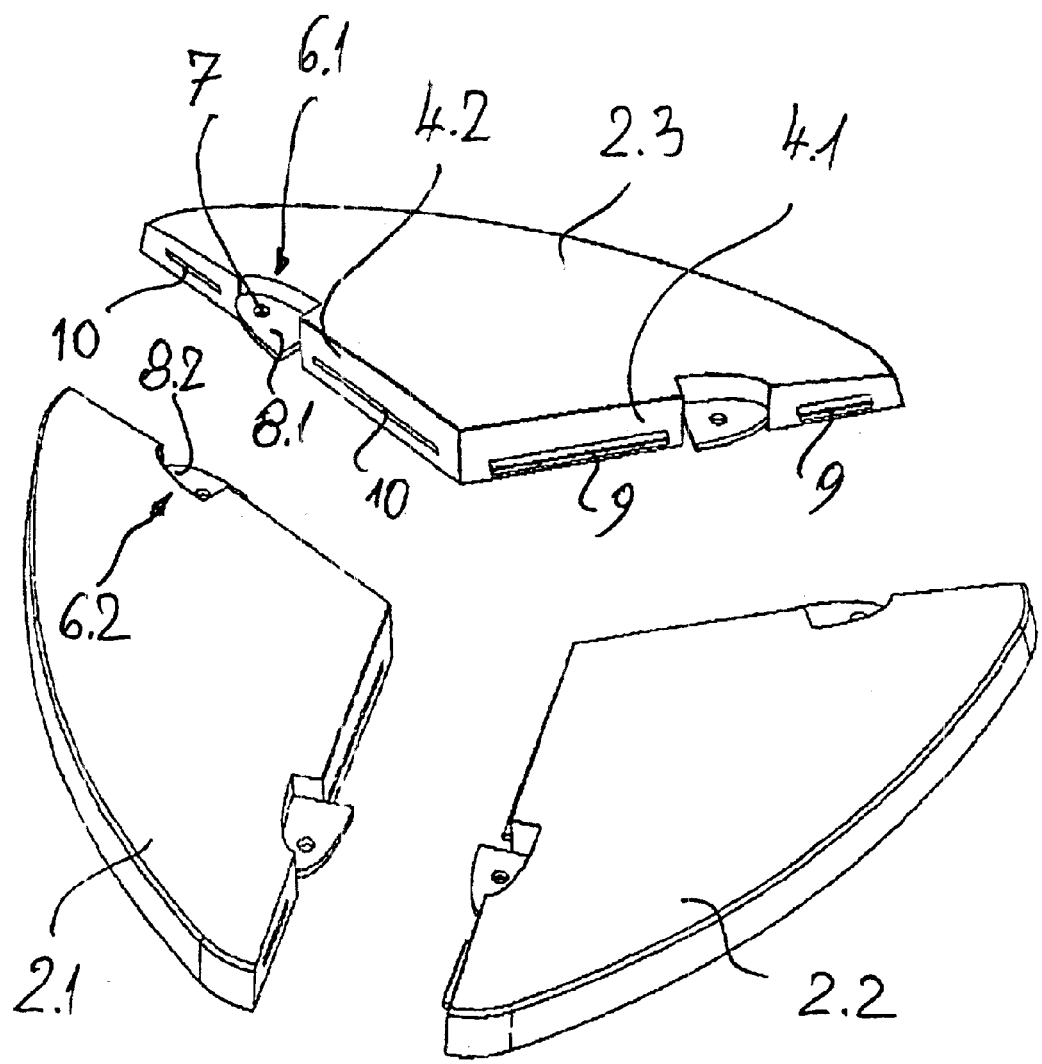
FIG. 4 shows a detail view of base plate parts according to FIG. 3 in perspective.

The separating planes 4 are so disposed in each case that they extend through the zone of the recesses 6 so that the recesses 6 are arranged with one part in one base plate part and with the other part in the other base plate part, as is evident in FIG. 4.

Each partial recess 6.1 and 6.2 is provided with a bottom plate 8.1 and 8.2, as is illustrated in FIG. 4. The bottom plates 8.1 and 8.2 protruding in tongue-like manner are arranged vertically offset to one another so that they overlap one another in the fitted-together condition and the through-holes 7 in both base plates 8.1 and 8.2 are in alignment with one another. Upon screwing the assembled base plate 2 to the base supports 5 the respectively adjoining base plate parts 2.1, 2.2 and 2.3 are thereby also joined together.

As is also apparent from FIG. 4, the separating planes 4 of each base plate part are provided with projections and/or recesses. As is evident from the view of the base plate part 2.3 in FIG. 4, the separating plane 4.1 is provided with projections 9 and the separating plane 4.2 is provided with recesses 10. Since the individual base plate parts are of identical design, the projections 9 of the base plate part 2.1 can be fitted into the recesses 10 of the base plate part 2.3 and correspondingly the respective projections 9 on the base plate parts 2.2 and 2.3 can be fitted into the recesses in the adjacent base plate parts. In combination with the screw-fastening of the base plate parts to the base supports 5, a form-locking connection of the individual base plate parts to one another also protected against deflection is thereby provided.

FIG. 5.1 illustrates in a side view the base plate part 2.3 according to FIG. 4. The side view also shows the bottom plate 8 protruding in tongue-like manner beyond the separating plane 4.1, as well as the projection 9.

The view from below according to FIG. 5.2 shows that in the embodiment illustrated by way of example the individual base plate parts are produced dish-shaped, for example from plastics material. It is also evident that the largest lateral dimension $a$ of the stand part 1 predetermined by the distance between two adjacent base supports 5 is greater than the distance $c/x$, the dimension $c$ corresponding to the maximum length of the base plate part 2.3.

If, with such a configuration, the dimension $c/x$ is calculated to be smaller than the dimension $a$, in the embodiment according to FIG. 2 with the drawn-in front edges of the compartments the possibility is provided of placing the individual base plate parts in each case between two base supports 5 for packing purposes so that a suitable packaging with a cross-section of triangular shape is obtained, which is predetermined by the lateral distance $a$ of the base supports 5 from one another.

Figure 6:
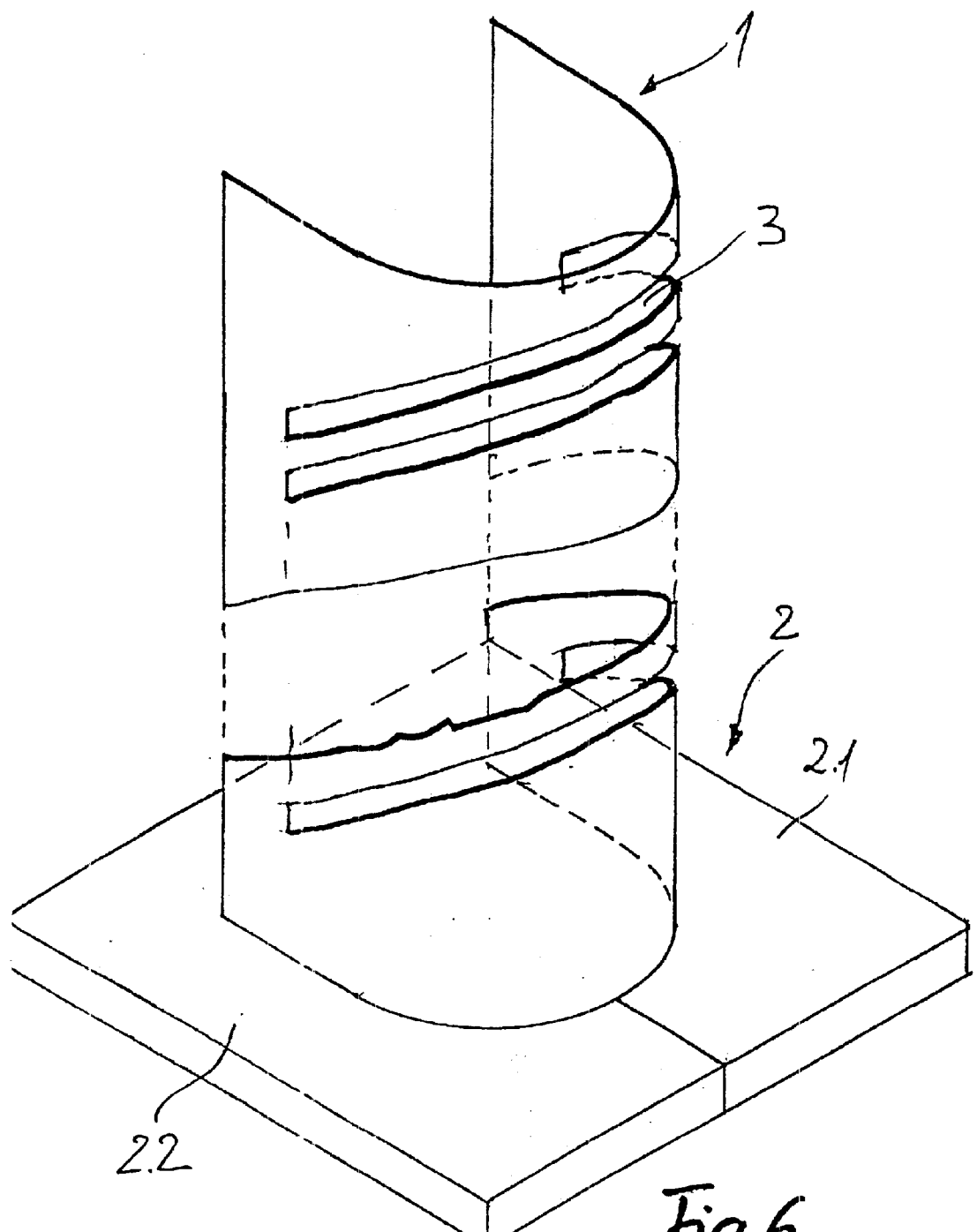
FIG. 6 shows schematically a further possible development.

In a further example of embodiment, FIG. 6 illustrates a rack, for example of sheet metal, the stand part 1 of which is substantially in the form of a U-shaped sheet profile, in which the compartments 3 are formed by suitable indentations in the apex region of the U-shaped profile.

In this embodiment it is also advantageous if the base plate 2 is divided into several base plate parts which can be connected to the stand part 1, for example by a screw connection. Here too, the transverse dimension of the individual base plate parts is to be so calculated that it corresponds at maximum to the largest width of the stand part, thereby ensuring also in this embodiment that a compact packing cross-section is obtained which allows the base plate parts to be inserted into the packaging.

What is claimed is:

1. A rack for stacking flat articles, in particular cases for disc-type information carriers, having a stand part and a base part, wherein the stand part has at least three base supports which are provided with substantially horizontally formed web elements arranged spaced apart one above the other, which form substantially horizontally aligned compartments for accommodating the flat articles, wherein the base part is formed by a base plate which is releasably connectable with the stand part, and the base area of said base plate is larger than a projection of the stand part on the base plate, and wherein the base plate is assembled from at least two base plate parts.

2. A rack according to claim 1, wherein a transverse dimension of a base plate part corresponds at maximum to the largest transverse dimension of the stand part.

3. A rack according to claim 1 wherein the base plate is divided into at least three base plate parts.

4. A rack according to claim 1 wherein on separating planes the base plate parts have projections and/or recesses associated with one another so that the base plate parts can be joined together in a plug-in form-locking manner.

5. A rack according to claim 1 wherein the base plate parts have a recess in the connection zone with the base supports.

6. A rack according to claim 5 wherein each recess has a bottom plate with a through-bore to effect a screw connection with the lower ends of the base supports.

7. A rack according to claim 5 wherein the recesses are each arranged in halves in the vicinity of separating planes of said base plate parts.

8. A rack according to claim 7 wherein each recess half is provided with a bottom plate part protruding in tongue-like manner over the separating plane, wherein the bottom plate parts of a recess overlap one another in a fitted-together condition.

9. A rack according to claim 1, wherein said base plate parts are separable from one another.

* * * * *